Patented July 6, 1954

2,683,126

UNITED STATES PATENT OFFICE 2,683,126

SYNTHETIC RESIN COMPOSITIONS PREPARED FROM THE CYCLIC ADDUCT OF A CONJUGATED DIENE AND A $\beta,\alpha$-UNSATURATED ALCOHOL Joseph Nichols, Bronx, N. Y., assignor to Interchemical Corporation, New York, N. Y., a corporation of Ohio No Drawing. Application June 16, 1951, Serial No. 232,050

11 Claims. (Cl. 260—23.7)

The present invention is a continuation-in-part of my disclosure Serial No. 13,589, filed March 6, 1948, which has matured into U. S. Patent No. 2,557,136 of June 19, 1951, and relates to a novel class of resinous products which are obtained by esterifying or co-esterifying an $\alpha,\beta$-unsaturated dicarboxylic acid or the anhydride thereof with the adduct of a conjugated diene, such as butadiene, isoprene, or cyclopentadiene and a $\beta,\gamma$-unsaturated alcohol, such as allyl alcohol, methallyl alcohol, or crotyl alcohol.

A new type of ester has been found which is easily polymerizable into excellent thermosetting resins. These esters may initially be obtained either as condensation products already polymerized to a certain degree, or as monomers which may be low viscosity, light colored oils or high melting, crystalline products. Both can be bodied to any desired viscosity by means of heating. The esters have been found compatible with most commercial alkyds, lacquers and varnishes and valuable compositions may be made therefrom, having improved properties of adhesion, film toughness, and hardness as well as high resistance toward influences of the atmosphere, and of acids and alkalies. Since, furthermore, the esterification may be conducted in the presence of diverse modifiers, the herein claimed invention furnishes the basis for a great variety of new compositions.

Some adducts have been utilized before in the preparation of ester resins. Thus, the maleic acid-cyclopentadiene adduct (Carbic anhydride) has been condensed with saturated or unsaturated mono or polyhydric alcohols, with or without drying oil fatty acids, or Carbic anhydride has been co-esterified with polyhydric alcohols and acidic natural resins. Resin compositions of this type, however, are entirely dissimilar from the here claimed condensation products, in that they have, generally, poor thermosetting properties. Although diallyl carbate, for instance, may be polymerized by using a peroxide catalyst or by blowing with air while heating, it does not show any appreciable increase in viscosity after being heated under carbon dioxide for, say, eight hours at 200° C.

While I found the adducts between conjugated dienes and $\beta,\gamma$-unsaturated alcohols, after esterification with most saturated and unsaturated mono- or dicarboxylic acids, to give valuable products for different uses, such as the ester from the cyclopentadiene-allyl alcohol adduct with sebacic acid, which, for instance, provides an excellent plasticizer for vinyl polymers, compounds of this type proved to be non-curing similar to the esters made from Carbic anhydride. Therefore it was entirely unexpected that heat curable, thermosetting resins rather than thermoplastic materials would result from the esterification of the said adducts with $\alpha,\beta$-unsaturated dicarboxylic acids. The surprising fact that thermosetting resins result from a reaction of this type must be attributed in the first place, to the activity of the isolated double bond contained in the molecule of the adducts, since I found that hydrogenation of these adducts, with platinum oxide at room temperature, for instance, whereby the double bond is eliminated, destroys all thermosetting properties. Secondly, it must be attributed to the specific unsaturation of $\alpha,\beta$-unsaturated dicarboxylic acids, since esterification with saturated acids produces non-thermosetting materials. It seems that in this instance the double bonds of the reactants mutually activate each other and that thereby an inordinate opportunity for linkages arises, as illustrated by the following probably structure of an intermediary stage of polymerization of the maleic ester of the allyl alcohol cyclopentadiene condensate.

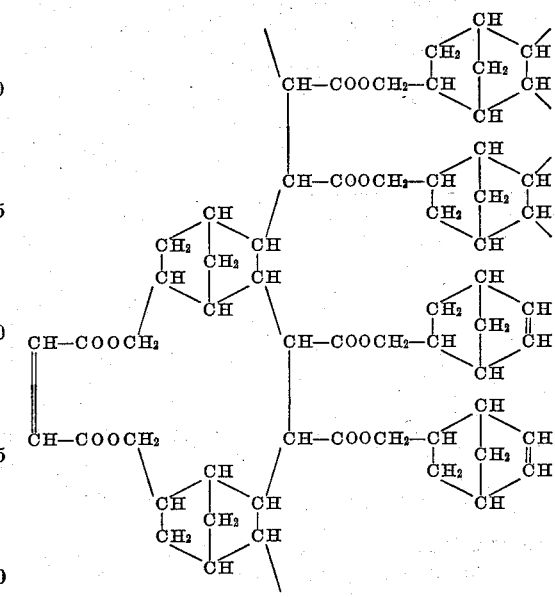

Since these new esters differ considerably in their individual properties, especially as to viscosity and susceptibility to polymerization, they provide a great variety of products for divers uses. Thus, while the maleic ester of 2,5-endomethylene-Δ³ tetrahydrobenzyl alcohol ordinarily yields a liquid product, which does not solidify on prolonged standing, the corresponding fumaric ester for convenience in handling is bodied to a high viscosity compound, because the monomeric fumaric ester which predominates is a high melting solid and will crystallize from the reaction composition if present in too high a concentration. Similar esters, such as prepared from the butadiene- or isoprene-allyl alcohol adduct, are usually obtained as low viscosity monomeric oils (below 10 poises), after the esterification has been completed, but may be bodied thereafter to any desired viscosity.

Apparently, the methylene bridge in the allyl alcohol-cyclopentadiene molecule creates a strain in the ring system which increases the reactivity of the double bond and the absence of such a methylene bridge in similar adducts from other conjugated dienes accounts for the somewhat lower rate of polymerization of their esterification products with α,β-unsaturated dicarboxylic acids.

The temperature at which the esterification is carried out must be carefully regulated and is preferably held between about 180° to 190° C. since heating to 200° C. and above will impair the color of the final product. The esterification products are light-yellow oils which cure to hard, brittle films.

I now find, that these esters can be advantageously prepared by using stoichiometric quantities of the reaction materials. In calculating the amount of the unsaturated alcohol-diene adduct, the degree of purity thereof must be taken into account. For example, batches of the cyclopentadiene-allyl alcohol adduct may vary from 75 to 95% purity, calculated from the hydroxyl analysis.

At the end of the esterification, particularly when carried out in the presence of an azeotrope-forming agent, such as xylene, the esters are obtained essentially as monomeric materials. On heating at elevated temperatures, for example 200° to 220° C., the viscosity of these materials increases. On prolonged heating, gelation eventually occurs. The rates of bodying, by heating and agitating the resins under carbon dioxide at 200° C. are as follows:

| | hours of bodying | | | | | |
|---|---|---|---|---|---|---|
| | 0 | 1 | 2 | 3 | 4 | 5 |
| allyl alcohol-isoprene maleate poises | 8.8 | 13 | 30 | 35 | 90 | 150 |
| allyl alcohol-butadiene maleate poises | 3.7 | 8 | 27 | 46 | 70 | 120 |
| allyl alcohol-butadiene fumarate poises | 5.5 | 15 | 35 | 70 | 125 | |
| allyl alcohol cyclopentadiene maleate poises | 27 | 50 | 75 | 140 | | |
| allyl alcohol cyclopentadiene fumarate poises | 28 | 70 | 160 | | | |
| allyl alcohol-methyl pentadiene maleate poises | 15 | 24 | 38 | 54 | 72 | 96 |
| allyl alcohol-methyl pentadiene fumarate poises | 54 | 80 | 128 | 158 | 200 | |
| crotyl alcohol cyclopentadiene maleate poises | 25 | 40 | 60 | 95 | 135 | |
| crotyl alcohol cyclopentadiene fumarate poises | 35 | 50 | 64 | 123 | 180 | |

Films of these resins, such as of the maleic or fumaric ester of an allyl alcohol-cyclopentadiene condensate, when coated on glass or tin panels, cure completely within 10 to 20 minutes at 325° F., while similar esters made with adducts of isoprene, butadiene, or methyl pentadiene with allyl and similar alcohols require a somewhat longer baking time to attain an equal resistance.

The polymerization may also be catalyzed by peroxide, such as tertiary butyl perbenzoate. Using three per cent of this catalyst, the maleic ester of the allyl alcohol-cyclopentadiene adduct, for example, cast-polymerizes at a temperature of 110°–150° C.

These esters are found to be almost universally compatible with commercial resins. They are compatible with nitrocellulose, ethylcellulose, polyvinyl chloride, copolymers of vinyl chloride and vinyl acetate, modified alkyds, varnishes, other cyclopentadiene resins, melamine formaldehyde resin in 1:1 butanol-xylene solution, linseed oil, etc. and they are soluble in most of the common solvents, except glycol, diethylene glycol, and water.

These unsaturated alcohol-conjugated diene adducts may advantageously be co-esterified with α,β-unsaturated dicarboxylic acids in the presence of other suitable co-reactants. By heating, for example, 2,5-endomethyleneΔ³tetrahydrobenzyl alcohol and maleic anhydride in the presence of, say, glyceride drying oils, drying oil fatty acids, polyhydric alcohols, di-cyclopentadiene, and saturated polycarboxylic acids, modified products may be obtained. In the polyhydric alcohol modification, maleic anhydride, of course, is partially esterified with the polyhydric alcohol, while in the case of the drying oil fatty acid modification, a sufficient amount of the adduct must be employed also to esterify these acids. If, for example, one of the afore-described monomeric unsaturated alcohol-conjugated diene esters is simply mixed with glyceride drying oils, the resultant composition is essentially similar, but generally of somewhat lower viscosity which may be raised by heating.

Such modified esters, in turn, are compatible with most other alkyds, and with lacquers and varnishes. When the maleic ester of 2,5-endomethyleneΔ³-tetrahydrobenzyl alcohol as such, or co-polymerized with different amounts of linseed oil or dehydrated castor oil, is mixed in various proportions (1:1, 1:3, 1:5, 1:10) with raw linseed oil, mineral oil, linseed oil plus mineral oil (50% solids), 36% oil modified alkyd, 29% oil modified alkyd, phenolic tung linseed oil varnish, plasticized lacquers containing 23% ½ second nitrocellulose and 7% 150 second nitrocellulose respectively, only the 1:10 mixtures with mineral oil develop cloudiness.

The compatibilities of these new thermosetting esters makes them particularly useful in vinyl coating compositions.

According to the invention a thermoplastic film-forming vinyl resin, especially a polyvinyl chloride, polyvinyl acetate, or vinyl chloride-vinyl acetate-α,β-unsaturated dicarboxylic acid terpolymer is dispersed or dissolved in a volatile organic solvent solution of one of the aforementioned thermosetting ester resins. It is to be understood that these three ingredients are only the essential ingredients of the compositions. Other ingredients such as conventional stabilizers, marproofing agents, plasticizers, pigments and the like can of course be employed to produce the particular end result that is desired in any particular application.

It is well known that vinyl resins in general are only slightly soluble in many of the conventional volatile organic solvents used in solution type coating compositions. Also the solubility of these resins generally decreases as the molecular weight of the resin increases. Accordingly, it has been found that the relatively high molecular weight vinyl resins are the most suitable for the organosol type coatings of the present invention. The resins are generally employed in the form of discrete particles, usually of the order of 1 to 250 microns, which, after suitably dispersing in solvent, as by ball milling, can be readily broken down to particles of size which are surface solvated and held in suspension. The resin particles form substantially stable suspensions and when coated on surfaces can be baked to smooth continuous films. Specific organosol resins which are commercially available include the various vinyl chloride polymers and vinyl chloride-vinyl acetate copolymers sold under various tradenames such as Vinylite VYNV-1 (a copolymer of vinyl chloride and vinyl acetate, containing about 96 to 97% polyvinyl chloride), Vinylite VYNV-2, Vinylite VYNV-3 (both being straight polyvinyl resins) of Carbide and Carbon Chemicals Co., Pliovic AO (a resin copolymer containing 95% polyvinyl chloride and 5% diethyl maleate) of Goodyear Tire & Rubber Co., Marvinol VR-10 (a high molecular weight polyvinyl chloride resin, sp. gr. 1.4) of the Glenn L. Martin Co., and Geon 101 (a high polymer vinyl chloride, sp. gr. 1.41) of the B. F. Goodrich Co.

Typical vinyl resins that are useful in solution type coating compositions in accordance with the present invention are: polyvinyl acetate, such as the trade name products Vinylite AYAT of Carbide and Carbon Chemicals Co. and Gelva V-7 of Shawinigan Products Co. (both being polymerized vinyl acetate resins); vinyl chloride-vinyl acetate copolymers such as Vinylite VYHH (copolymer of vinyl chloride and vinyl acetate containing about 85 to 88% vinyl chloride, mol. wt. 10,000) and Vinylite VYLF (a copolymer of vinyl chloride and vinyl acetate containing about 67% vinyl chloride) and vinyl chloride-vinyl acetate-maleic anhydride terpolymers such as Vinylite VMCH (a copolymer of vinyl chloride and vinyl acetate, containing about 85 to 88% polyvinyl chloride, copolymerized with 1% maleic anhydride), all of Carbide and Carbon Chemicals Co.

The vinyl chloride-vinyl acetate copolymers which are most suitable for use in the present invention are those containing from about 2 to 15% of vinyl acetate. The vinyl chloride-vinyl acetate-$\alpha,\beta$-unsaturated dicarboxylic acid terpolymers which are most suitable for the present invention are the ones containing 2 to 15% vinyl chloride and 1 to 2% of the dicarboxylic acid. Also, of all the vinyl resins that are operable in the present invention, I especially prefer polyvinyl chloride and interpolymers of vinyl chloride which contain 85 or more per cent of vinyl chloride because, as is well known to the art, these high vinyl chloride content resins are harder and more resistant than the low vinyl chloride content resins.

Vinyl resins are compatible with these new thermosetting ester resins in substantially all ratios, however, it has been found that the ratios of these materials which give the best cured films lie within the ratios of about 20 to 80 parts vinyl resin to 80 to 20 parts of the thermosetting ester resin. Cured films of such compositions are not attacked by many organic solvents and the solubility of the films in vinyl resin solvents decreases as the proportion of vinyl resin is decreased. The films also have unusually good heat stability, when compared to other vinyl resin films and adhesion to surfaces, especially metal surfaces, is very good. The thermosetting esters are good grinding media for pigments and thus facilitate the addition of pigments to the compositions. Also, the thermosetting esters act as solvents or fluxing agents for the vinyl resin when the film is baked, i. e. the two resins become homogeneous continuous films during the heating and cure to homogeneous, glossy films when completely cured. The novel organosol type compositions can be baked to tough adherent, continuous films in 20 minutes at temperatures as low as 150° C., whereas unmodified vinyl organosol films normally require temperatures of around 175° C. for satisfactory film continuity and such unmodified vinyl films generally do not have good adhesion, especially to metal surfaces.

Solvents which are useful in the present invention are in general those which are volatile under the condition of curing the film. Also the solvents must dissolve the thermosetting ester resin and should at least induce surface solvation of the thermoplastic resin. Typical solvents for vinyl resins and the thermosetting ester resins include: the volatile aliphatic ketones such as acetone, methyl ethyl ketone, methyl amyl ketone, methyl isobutyl ketone, isophorone, cyclohexanone and the like; the nitroparaffins such as nitromethane, nitropropane, and the like; esters such as butyl acetate, and the like. When the organosol-type coating is desired it is generally necessary to use mixtures of the above types of solvents with other volatile organic solvents which have less solvent power for the vinyl resins, for instance, the common organic solvents such as aromatic hydrocarbons, aliphatic hydrocarbons, glycol ethers, and the like.

Since the thermosetting ester resins are soluble in most of the common organic solvents, the selection of the appropriate solvent is largely dependent on the solubility of the vinyl resin. Thus, when an organosol coating is desired, the solubility of the particular vinyl resin will determine the solvent combination necessary to produce surface solvation of the vinyl resin particles. Of course, the amount of thermosetting resin present as compared to the thermoplastic resin, will influence the limiting amount of thermoplastic resin solvent or surface solvating agent that will be required in any particular instance in that, since the thermosetting ester resin acts as a solvent for the vinyl resin, less solvent power is needed when high ratios of thermosetting to thermoplastic resin are used than where low ratios are used.

The amount of volatile solvent employed will of course vary with the particular resin combination used, the particular solvent, the manner in which the composition is to be applied, etc. In any event the amount of solvent must be sufficient at least to partially solvate the vinyl resin and to dissolve the thermosetting ester resin, and to provide a body or consistency suitable for application to the surface to be coated by conventional methods such as spraying, dipping, brushing, etc.

In preparing the condensation products between $\beta,\gamma$-unsaturated alcohols and conjugated dienes, the procedure of U. S. Patent 2,352,606 may be followed. The following examples in which the parts are by weight are given below to further illustrate the invention.

*Example 1*

A mixture of butadiene (531 parts) and allyl alcohol (2125 parts) is heated in an autoclave at 200°—225° C. for 8 hours. The reaction mixture is then subjected to fractional distillation to give 365 parts (33% of the theoretical) of the butadiene-allyl alcohol condensation product (1,2,5,6-tetrahydrobenzyl alcohol), which is a colorless liquid boiling at 76° C./5 mm. Hg.

Example II

A mixture of isoprene (680 parts) and allyl alcohol (2900 parts) is heated in an autoclave at 230° C. for 6 hours. On distillation of the reaction mixture, 487 parts (38.7% of the theoretical) of the adduct is obtained, which boils at 91° C./5 mm. Hg.

Example III

A mixture of methyl pentadiene (985 parts), consisting of 85% 2-methyl-1,3-pentadiene and 15% 4-methyl-1,3-pentadiene, and allyl alcohol (3088 parts) is heated in an autoclave at 250° C. for 8 hours. The reaction mixture is then subjected to fractional distillation whereby the excess allyl alcohol is recovered and the methyl pentadiene-allyl alcohol condensation product (494 parts—29.4% of the theoretical) is collected as a colorless liquid boiling at 83° C./2 mm. Hg.

Example IV

A mixture of 99% grade dicyclopentadiene (330 parts) and crotyl alcohol (720 parts) is heated in an autoclave at 220°–235° C. for 12 hours. The reaction mixture is then fractionated to recover the excess crotyl alcohol. 270 parts (38.9% of the theoretical) condensation product is recovered as a liquid boiling at 81°–86° C./1 mm. Hg.

Example V

A mixture of butadiene (648 parts) and methallyl alcohol (2592 parts) is heated in an autoclave at 230° C. for 24 hours. After fractionation of the reaction mixture, 212 parts (14% of the theoretical) condensation product is obtained which boils at 68°–74° C./2 mm. Hg.

Example VI

A mixture of maleic anhydride (1078 parts) and 2,5-endomethylene-$\Delta^3$-tetrahydrobenzyl alcohol, the allyl alcohol adduct of cyclopentadiene (3274 parts), is heated and agitated under $CO_2$, at 180°–190° C. for 8 hours. Water, liberated in the esterification is collected in a water trap which permits the return to the reaction mixture of any of the alcohol carried over by the water vapors. Unreacted materials are then removed by vacuum or steam distillation. There is obtained 572 parts of distillate and 3500 parts of a light yellow oil, having an acid number of 2.0 and a viscosity of 27 poises.

Example VII

A mixture of fumaric acid (1276 parts) and the allyl alcohol adduct of cyclopentadiene (3274 parts) is heated and agitated under $CO_2$, at 180–190° C. for 8 hours, whereby the alcohol, carried over into a water trap, is returned to the reaction mixture. Upon completion of the esterification, unreacted materials are removed by vacuum or steam distillation. There is obtained 540 parts of distillate and 3580 parts of a light yellow oil, having an acid number of 2.3 and a viscosity of 28 poises. However, on standing at room temperature, this oil solidifies almost completely due to the crystallization of the high melting, monomeric allyl alcohol-cyclopentadiene fumarate which is present in large amounts.

The reaction product is again liquefied by means of heating and is then bodied, under $CO_2$ at 200° C. for approximately 3 hours, to a viscosity of 1000 poises. At this viscosity, the oil remains indefinitely fluid.

Example VIII

A mixture of fumaric acid (1290 parts), the allyl alcohol adduct of cyclopentadiene (3600 parts), and xylene (489 parts), is heated and agitated under $CO_2$, at 140°–145° C. for 3½ hours. The water formed by the esterification reaction is carried into a water trap as a xylene-water azeotropic mixture which is automatically separated and the xylene returned to the reaction mixture. Heating is continued until the distillation of water is substantially completed. At this point a portion of the xylene is distilled off so that the reaction temperature is increased to 180° C. The temperature is maintained at this point for about 2½ hours at which time the acid number of the reaction mixture is about 15. A vacuum of approximately 26½ inches of mercury is applied for about 1½ hours to remove the remaining xylene and any unreacted materials. A yield of 3540 parts of the substantially pure monomeric allyl alcohol-cyclopentadiene adduct ester of fumaric acid is obtained. The product has an acid number of about 10 and a melt viscosity of approximately 25 poises by the Gardner-Holdt viscosity tubes. On cooling it crystallizes completely.

Example IX

A mixture of maleic anhydride (1400 parts), the allyl alcohol adduct of cyclopentadiene (3900 parts) and xylene (530 parts) is heated and agitated under $CO_2$ at 145°–150° C. The water formed by the esterification reaction is carried into a water trap as a xylene-water azeotropic mixture and the xylene is returned to the reaction mixture. As the esterification proceeds the temperature gradually increases to about 180° C. where it is maintained until the acid number of the reaction mixture has decreased to about 13. A vacuum of about 26½ inches mercury is then applied, the xylene and unreacted components are removed by distillation. The final product is a pale, amber clear liquid weighing 4150 parts. It has an acid number of 8 and a viscosity of approximately 12 poises as measured by the Gardner-Holdt viscosity tubes. In preparing this product the esterification time is approximately 6½ hours and the vacuum treatment about 2 hours.

Example X

A mixture of maleic anhydride (1470 parts), the allyl alcohol adduct of cyclopentadiene (3910 parts—95.6% purity), and xylene (550 parts) is heated and agitated under $CO_2$ at about 170° C. The water-xylene azeotropic mixture which distills is cooled in a trap and the xylene returned to the reaction mixture. Heating is continued for approximately 6 hours and the temperature is gradually increased to 195° C. The acid number at this time is approximately 8. The mixture is cooled to 120° C. and a vacuum of about 40 mm. Hg is applied. Xylene and unreacted ingredients are distilled. The temperature is again increased over a period of 2 hours to 195° C. while the pressure is decreased to 1 to 2 mm. Hg. The vacuum is released and the product cooled to 160° C. Steam is then passed through a delivery tube into the reaction mixture to steam distill final traces of unreacted components. The steam distillation is continued for 2 hours and the temperature increased to 200° C. The final product weighs 430 parts and has a viscosity of 31 poises at 30° C. In this example the amount of the allyl alcohol aduct of cyclopentadiene is calculated to correspond to the stoichiometric equivalent of the maleic anhydride employed.

*Example XI*

A mixture of itaconic acid (143 parts) and the allyl alcohol adduct of cyclopentadiene (323 parts) is heated for 9 hours as described in Example VI and any unreacted materials are then removed in the disclosed manner. There is obtained 343 parts of a viscous oil, having an acid number of 7.7. This resin is not stable, for it gels upon a few days standing at room temperature.

*Example XII*

A mixture of maleic anhydride (110 parts) and the allyl alcohol-butadiene adduct of Example I (302 parts) is heated and agitated under $CO_2$, at 180°–190° C. for 12 hours in a manner illustrated in Example VI. Upon completion of the esterification, the unreacted materials are removed from the mixture by vacuum distillation, at 200° C./5 mm. Hg. The esterification product is a light yellow oil of an acid number of 4.3 and a viscosity of 3.7 poises.

*Example XIII*

A mixture of fumaric acid (130 parts) and the allyl alcohol-butadiene adduct of Example I (302 parts) is heated in the foregoing manner for 12 hours and the unreacted materials are removed as disclosed in Example VI. The yield is 315 parts of a light yellow oil of an acid number 4.7 and a viscosity of 5.5 poises. Upon standing at room temperature, monomeric fumaric acid ester of 1,2,5,6-tetrahydrobenzyl alcohol crystallizes from the oil.

*Example XIV*

A mixture of maleic anhydride (171 parts) and the allyl alcohol-isoprene adduct of Example II (529 parts) is heated for 15 hours and the unreacted materials removed as disclosed in Example VI. The yield is 545 parts of a light yellow oil, having an acid number of 8.0 and a viscosity of 8.8 poises.

*Example XV*

A mixture of fumaric acid (203 parts) and the allyl alcohol-isoprene adduct of Example II (529 parts) is heated and agitated for 18 hours and the unreacted materials removed as disclosed in Example VI. 540 parts of a yellow oil is obtained, of an acid number 8.7 and a viscosity of 600 poises.

*Example XVI*

A mixture of maleic anhydride (123 parts) and the allyl alcohol-methyl pentadiene condensate of Example III (420 parts) is heated and agitated under $CO_2$, at 180°–190° C. for 10 hours. The alcohol carried out of the mixture by the liberated water of esterification is returned to the reaction mixture by means of a suitable trap. On completion of the esterification, the unreacted materials are removed from the mixture by vacuum distillation. The product (430 parts) is a light yellow oil of an acid number of 7.1 and a viscosity of 15 poises.

*Example XVII*

A mixture of fumaric acid (116 parts) and the crotyl alcohol-cyclopentadiene condensate of Example IV (331 parts) is heated for 8 hours and the esterification product recovered as disclosed in Example XVI. The product is a light yellow oil (325 parts) of an acid number of 5.0 and a viscosity of 35 poises.

*Example XVIII*

A mixture of maleic anhydride (64 parts) and the methallyl alcohol-butadiene condensate of Example V (198 parts) is heated and agitated under $CO_2$ at 230° C. for 30 hours. Excess alcohol is returned to the reaction mixture in a suitable manner and, at the end of the heating period, the unreacted materials are removed by vacuum distillation, leaving 175 parts of a semisolid product of an acid number of 27.6.

*Example XIX*

A mixture of fumaric acid (75 parts) and the methallyl alcohol-butadiene condensate of Example V (98 parts) is heated and the esterification product recovered in the manner disclosed in Example XVIII. The resulting product consists of 185 parts of a semi-solid substance having an acid number of 25.4.

*Example XX*

A mixture of fumaric acid (522 parts), sebacic acid (203 parts), and the allyl alcohol adduct of cyclopentadiene (1647 parts) is heated and agitated under $CO_2$ at 180°–190° C. for 10 hours. The alcohol adduct, carried out of the mixture by the water of esterification is returned to the reaction mixture. On completion of the esterification unreacted materials are removed by vacuum distillation. There is obtained 1825 parts of a light yelolw oil of an acid number of 1.0 and a viscosity of 95 poises.

*Example XXI*

A mixture of maleic anhydride (98 parts), dehydrated castor oil acids (40 parts), and the allyl alcohol adduct of cyclopentadiene (350 parts) is esterified in the manner of the foregoing example at 180° C. for 4 hours and then at 230° C. for 2 hours. The removal of volatile unreacted materials by vacuum distillation leaves 375 parts of a product having an acid number of 5 and a viscosity of 30 poises.

*Example XXII*

A mixture of maleic anhydride (882 parts), the allyl alcohol adduct of cyclopentadiene (2925 parts), and linseed oil (900 parts) is heated and agitated under $CO_2$ at 185°–190° C. for 13 hours. After removal of volatile unreacted materials by vacuum distillation at 210° C./5 mm. Hg, 670 parts of a product is obtained having an acid number of 5.6 and a viscosity of 10.7 poises.

*Example XXIII*

A mixture of maleic anhydride (882 parts), the allyl alcohol adduct of cyclopentadiene (3125 parts), and dehydrated castor oil (900 parts) is heated and agitated under $CO_2$ at 185°–190° C. for 15 hours. After removal of volatile unreacted materials as in Example XXII, 590 parts of the distillate is recovered and 3950 parts of a product having an acid number of 8.5 and a viscosity of 46.3 poises.

*Example XXIV*

A mixture of fumaric acid (1044 parts), allyl alcohol-cyclopentadiene condensate (2700 parts) and dehydrated castor oil (820 parts) is heated and agitated under $CO_2$ at 180°–190° C. for 10 hours. The separation of volatile unreacted materials by vacuum stripping yields 3766 parts of light yellow oil having an acid number of 5.6 and a viscosity of 200 poises.

Example XXV

A mixture of maleic anhydride (1274 parts), the allyl alcohol adduct of cyclopentadiene (2418 parts), and diethylene glycol (351 parts) is heated and agitated under $CO_2$ at 185°–190° C. for 7 hours. After another addition of alcohol (500 parts) the heating is continued for 7 more hours. The removal of unreacted materials results in 550 parts distillate and 3740 parts of a product having an acid number of 8.1 and a viscosity of about 1200 poises.

Example XXVI

A mixture of maleic anhydride (262 parts), the allyl alcohol adduct of cyclopentadiene (540 parts), and propylene glycol (60 parts) is heated within 34 minutes to 180° C. and held at this temperature for 2 hours while being agitated under an inert gas. The temperature is then raised to 200° C. and held at that level for 3 hours. The product is a clear, almost colorless balsam which is compatible with polyvinyl chloride.

Example XXVII

A mixture of maleic anhydride (450 parts), the allyl alcohol adduct of cyclopentadiene (300 parts), and propylene glycol (300 parts) is heated as in the preceding example. A 60% solution of the resultant product in a mixture of non-volatile solvents is more viscous than a 75% solution of the product of Example XXVI.

Example XXVIII

A mixture of WG grade rosin (302 parts) and allyl-cyclopentadiene condensate (200 parts) is agitated and heated under reflux whereby the liberated water is allowed to escape from the reaction mixture. The initial temperature of 200° C. is permitted to rise to 260° C. in the course of 20 hours heating. Vacuum distillation leaves a straw colored solid of a melting point of 84°–93° C. and an acid number of 22.5.

Example XXIX

A mixture of rosin (300 parts), maleic anhydride (98 parts), and allyl alcohol-cyclopentadiene condensate (450 parts) is heated, under reflux, at 200°–230° C. for 36 hours. Excess volatile unreacted materials are removed by vacuum distillation, leaving a light yellow balsam, having an acid number of 13 and a melting point of 85°–90° C.

Example XXX

A mixture of ester gum (155 parts), maleic anhydride (50 parts), and allyl alcohol-cyclopentadiene condensate (165 parts) is heated, with stirring under $CO_2$, first for 3 hours at 180° C., and then for 2 hours at 230° C. Volatile unreacted materials are removed from the mixture by vacuum distillation, leaving 320 parts of a product which has an acid number of 16, melts at 50°–60° C. and is only slightly darker than the original ester gum.

The following examples are typical of coating compositions containing the above types of resins, together with vinyl or vinylidene resins, processes for applying such compositions to surfaces, and the coatings produced using such composition.

Example XXXI

| | Parts |
|---|---|
| Bone black | 23 |
| Organosol vinyl resin, e. g. Vinylite VYNV-1 | 280 |
| Plasticizer, e. g. dioctyl phthalate | 56 |
| Resin of Example VII | 84 |
| Diisobutyl ketone | 140 |
| Methyl isobutyl ketone | 47 |
| High aromatic hydrocarbon solvent of boiling range 160° to 246° C., w./gal. 7.4 lbs., dimethyl sulfate value 35.6, e. g. Velsicol #4 | 170 |
| Aliphatic hydrocarbon solvent of boiling range 155° to 205° C., w./gal. 6.58 lbs., flash point 102° F., aniline cloud point 109° F., K. B. value 43, e. g. Varnolene | 140 |
| Toluene | 60 |

The above ingredients are suitably mixed, as by ball milling for a time of the order of 72 hours. The resulting organosol composition is applied by conventional methods on bare steel and the film baked at 185° C. for 15 to 20 minutes to give a smooth, homogeneous, adherent coating. The coating is unusually tough and heat stable for a vinyl film. If desired, the steel surface or other metal surface can be first treated with a suitable primer before the application of the organsol composition. The use of primers is often desirable, especially when the composition is to be used on non-ferrous metals, because it materially increases the adhesion of the organosol coating to the surface.

Example XXXII

| | Parts |
|---|---|
| Aluminum paste, 75% solid, in a solvent such as mineral spirits, e. g. Albron 205 | 671 |
| Organosol vinyl resin, e. g. Marvinol VR-10 | 2520 |
| Resin of Example VI | 836 |
| Plasticizer (e. g. Paraplex G-25, a polyester of propylene glycol and sebacic acid) | 839 |
| Diisobutyl ketone | 1476 |
| Methyl isobutyl ketone | 447 |
| High aromatic hydrocarbon solvent of boiling range 160° to 246° C., e. g. Velsicol #4 | 1283 |
| Aliphatic hydrocarbon solvent of boiling range 155° to 205° C., e. g. Varnolene | 1923 |

The above ingredients are suitably mixed as in Example XXXI to give a typical organosol coating composition according to the present invention.

Example XXXIII

| | Parts |
|---|---|
| Organosol vinyl resin, e. g. Vinylite VYNV-1 | 2944 |
| Plasticizer, e. g. dioctyl phthalate | 736 |
| Resin of Example XII | 971 |
| Diisobutyl ketone | 1471 |
| Methyl isobutyl ketone | 490 |
| High aromatic hydrocarbon solvent of boiling range 160° to 246° C., e. g. Velsicol #4 | 1471 |
| Aliphatic hydrocarbon solvent of boiling range 155° to 205° C., e. g. Varnolene | 1917 |

The above ingredients are suitably mixed as in Example XXXI to give a typical organosol coating composition according to the present invention. The composition is applied by conventional methods and the film baked at 163° C. for 30 minutes to give a smooth, homogeneous, adherent coating.

In lieu of the resin of Example XII, resins of the Examples XIII, XIV, XVI, XVII, XVIII and XIX can be used, or say, the maleic acid ester of the crotyl alcohol-cyclopentadiene adduct, both in the unbodied and bodied forms.

Example XXXIV

A mixture of the resin of Example VIII (3000 parts) and dehydrated castor oil (3000 parts) are heated in an open varnish kettle at 250° C. for approximately 1¾ hours. A varnish of high viscosity is obtained which is cut with 1500 parts of xylene. This material is roller-coated on tin plate and forms a well cured film on baking for 20 minutes at 150° C.

Similarly useful varnishes are obtained by replacing the foregoing resin by the resin of, say, Example X and/or using dehydrated castor oil at the foregoing or any other suitable ratio. In place of the dehydrated castor oil, other drying oils, such as linseed oil or soybean oil can be employed.

Example XXXV

A mixture of the resin of Example IX (5000 parts) and tung oil (5000 parts) are heated in an open varnish kettle at 200° C. for approximately 2 hours. A varnish having a viscosity of about 460 poises/30° C. is obtained. When cool, the varnish is thinned slightly with xylene to facilitate handling and is applied to a tin plate by conventional methods. On baking for 10 minutes at 135° C., a well cured film is obtained.

By applying the foregoing resin and oil at other suitable ratios and by varying the cooking time, other similarly useful varnishes are obtained. In place of the resin of Example IX, other resins of the present invention can be employed, such as the resin of Example VIII.

I claim:

1. The method of preparing new monomeric, thermosetting products which comprises heating and agitating, in an inert atmosphere and in the presence of a volatile organic liquid which distills over in form of an azeotropic mixture with water, an $\alpha,\beta$-unsaturated dicarboxylic acid with about the stoichiometric amount of the cyclic adduct of a conjugated diene and a $\beta,\gamma$-unsaturated alcohol, separating the constituents of the distillate from each other, returning the volatile organic liquid to the reaction mixture, and finally removing the agent and any unreacted material.

2. A coating composition, the non-volatile film-forming vehicle of which comprises (1) 20 to 80 parts of a vinyl resin of the class consisting of polyvinyl chloride, polyvinyl acetate, vinyl chloride-vinyl acetate copolymers, and vinyl chloride-vinyl acetate-$\alpha,\beta$-unsaturated dicarboxylic acid terpolymers, and (2) 80 to 20 parts of a thermosetting resin which is the esterification product of (a) an $\alpha,\beta$-unsaturated dicarboxylic acid and (b) the cyclic adduct of a conjugated diene and a $\beta,\gamma$-unsaturated alcohol.

3. A coating composition as in claim 2 wherein the vinyl resin is vinyl chloride-vinyl acetate copolymer.

4. A coating composition as in claim 2 wherein the vinyl resin is vinyl chloride-vinyl acetate copolymer and the thermosetting ester resin is the esterification product of an $\alpha,\beta$-unsaturated dicarboxylic acid and 2,5-endomethylene-$\Delta^3$-tetrahydrobenzyl alcohol.

5. A coating composition comprising a volatile organic solvent solution of film-forming resinous ingredients consisting of (1) 20 to 80 parts of a vinyl resin of the class consisting of polyvinyl chloride, polyvinyl acetate, vinyl chloride-vinyl acetate copolymers and vinyl chloride-vinyl acetate-$\alpha,\beta$-unsaturated dicarboxylic acid terpolymers, and (2) 80 to 20 parts of a thermosetting resin which is the esterification product of (a) an $\alpha,\beta$-unsaturated dicarboxylic acid and (b) the cyclic adduct of a conjugated diene and a $\beta,\gamma$-unsaturated alcohol.

6. A coating composition comprising 20 to 80 parts of a surface solvated vinyl resin dispersed in a volatile organic solvent solution of 80 to 20 parts of a thermosetting resin which is the esterification product of (a) an $\alpha,\beta$-unsaturated dicarboxylic acid and (b) the cyclic adduct of a conjugated diene and a $\beta,\gamma$-unsaturated alcohol and wherein the said vinyl resin is a resin from the class consisting of polyvinyl chloride, polyvinyl acetate, vinyl chloride-vinyl acetate copolymers, and vinyl chloride-vinyl acetate-$\alpha,\beta$-unsaturated dicarboxylic acid terpolymers.

7. A coating composition as in claim 6 wherein the $\beta,\gamma$-unsaturated alcohol is allyl alcohol and the conjugated diene is cyclopentadiene.

8. A metal article coated with a tough, adherent film which is comprised of (1) 20 to 80 parts of a vinyl resin of the class consisting of polyvinyl chloride, polyvinyl acetate, vinyl chloride-vinyl acetate copolymers, and vinyl chloride-vinyl acetate-$\alpha,\beta$-unsaturated dicarboxylic acid terpolymers, and (2) 80 to 20 parts of a thermosetting resin which is the esterification product of (a) an $\alpha,\beta$-unsaturated dicarboxylic acid and (b) the cyclic adduct of a conjugated diene and a $\beta,\gamma$-unsaturated alcohol.

9. An oil modified varnish, consisting of the heat reaction product of a substantially monomeric ester of an $\alpha,\beta$-unsaturated dicarboxylic acid with the cyclic adduct of a conjugated diene and a $\beta,\gamma$-unsaturated alcohol in the presence of a drying oil.

10. The heat-reaction product between an $\alpha,\beta$-unsaturated dicarboxylic acid and the cyclic adduct of a conjugated diene and a $\beta,\gamma$-unsaturated alcohol in the presence of a saturated polycarboxylic acid as co-reactant.

11. The heat-reaction product between an $\alpha,\beta$-unsaturated dicarboxylic acid and the cyclic adduct of a conjugated diene and a $\beta,\gamma$-unsaturated alcohol in the presence of a glycol polyhydric alcohol as co-reactant.

References Cited in the file of this patent

UNITED STATES PATENTS

| Number | Name | Date |
| --- | --- | --- |
| 2,557,136 | Nichols | June 19, 1951 |